United States Patent [19]
Hintzman et al.

[11] Patent Number: 5,818,364
[45] Date of Patent: Oct. 6, 1998

[54] HIGH BIT-RATE HUFFMAN DECODING

[75] Inventors: Jeffrey A. Hintzman, Corvallis, Oreg.; Brian R. Jung, Poway, Calif.

[73] Assignee: Hewlett-Packard Company, Palo Alto, Calif.

[21] Appl. No.: 666,964

[22] Filed: Jun. 19, 1996

[51] Int. Cl.$^6$ ........................................ H03M 7/40
[52] U.S. Cl. .............................. 341/65; 341/67
[58] Field of Search .................. 341/60, 65, 67

[56] References Cited

U.S. PATENT DOCUMENTS

| | | | |
|---|---|---|---|
| 3,701,980 | 10/1972 | Mundy | 340/173 |
| 4,780,845 | 10/1988 | Threewitt | 364/49 |
| 4,899,149 | 2/1990 | Kahan | 341/67 |
| 5,208,593 | 5/1993 | Tong et al. | 341/65 |
| 5,245,338 | 9/1993 | Sun | 341/67 |
| 5,343,195 | 8/1994 | Cooper | 341/67 |
| 5,557,271 | 9/1996 | Rim et al. | 341/67 |
| 5,648,775 | 7/1997 | Kim | 341/67 |

OTHER PUBLICATIONS

"The Dawn Age: Minimum Redundancy Coding", The Data Compression Book, Mark Nelson, 1992, pp. 29–39.

"JPEG Huffman Entropy Coding", JPEG: Still Image Data Compression Standard, Chapter 11, pp. 189–201.

*Primary Examiner*—Howard L. Williams

[57] ABSTRACT

A high bit rate Huffman decoder is provided for compressed data bit stream. In an exemplary embodiment, JPEG and MPEG data compression is explained. An oversized input data register receives sequential input data words to be decoded. Each new data word is appended to data already in the register by right shifting the new data word by the number of valid data bits in the register. A bitwise logical OR operation is performed to load an operative data register. The operative data register is left-shifted based upon the number of bits in a previous Huffman code word-coefficient pair. The left-most pair of the appropriate size is separated for examination. The separated bit strings are examined as representing the coefficient of the previous code word-coefficient pair and the current code word. The code word is used to access a Huffman lookup table. The lookup table provides the zeroes run length, coefficient size, and code word-coefficient pair length which is used for the next left shift. Header/marker and byte boundary information are separately padded to construct same width words as the input data words. Simultaneous shifting in parallel with the data word examination preserves the relative locations of the header/markers with the data.

17 Claims, 3 Drawing Sheets

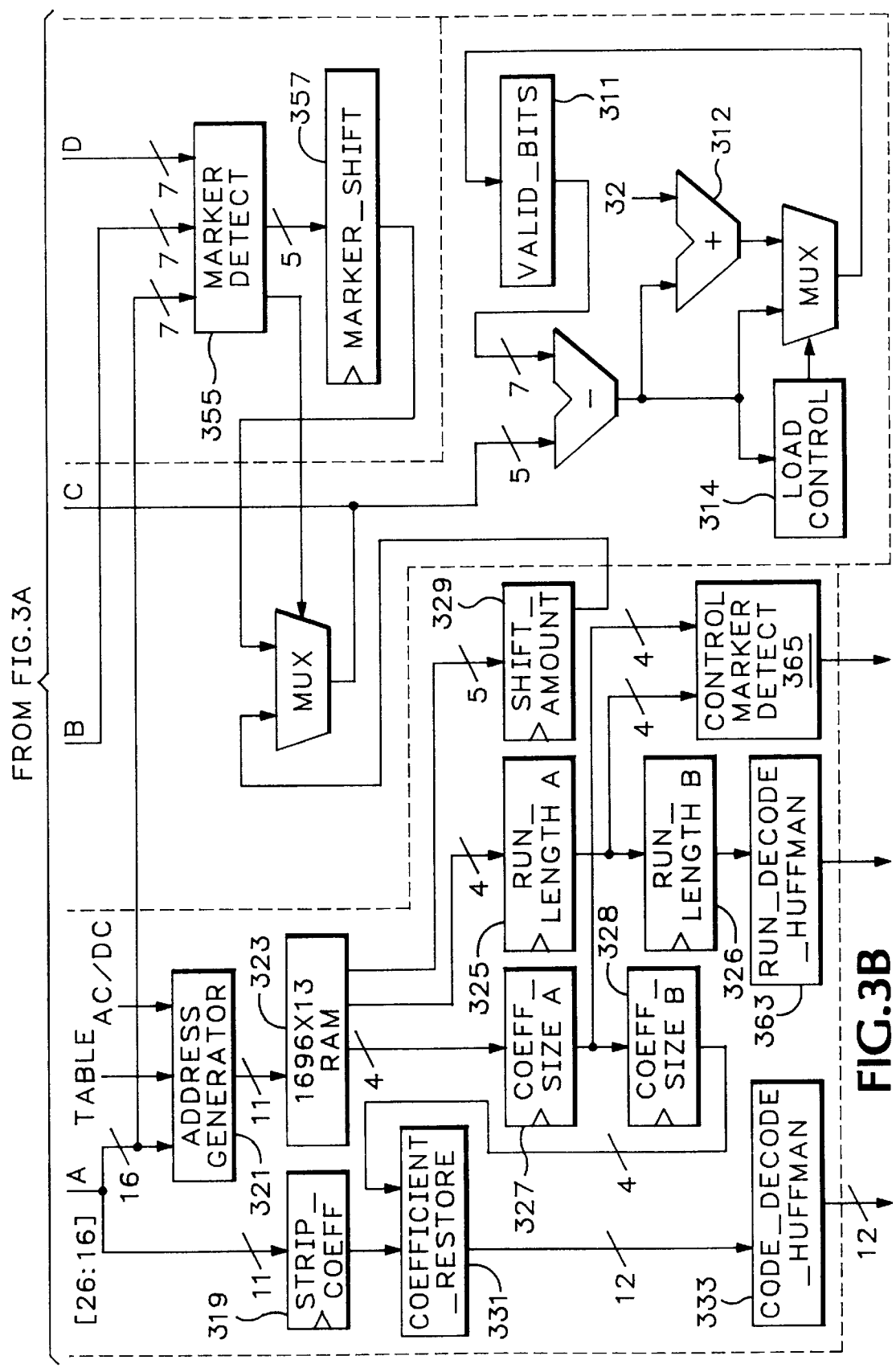

HIGH BIT-RATE HUFFMAN DECODING

BACKGROUND OF THE INVENTION

1. Field of the Invention

The present invention relates generally to data compression and decompression using Huffman coding, particularly to Huffman coding in still image (JPEG) and video image (MPEG) applications, and specifically to high bit-rate Huffman decoding.

2. Description of Related Art

The compacting of data, also referred to as data compression, for either transmission or long-term storage can be accomplished using variable length coding techniques. Data bit strings of fixed length are encoded into bit strings of variable length, with more frequently occurring data bit strings, or words, being represented by shorter length code words, thus reducing the transmission time or storage facility requirements. Compressed data cannot be utilized by a data processor in this compacted form. Therefore, it is decoded back into its fixed length form, also known as decompression.

One form of minimum redundancy, variable length codes was proposed by D. A. Huffman in an article entitled "A Method for the Construction of Minimum Redundancy Codes," proceedings of the IEEE, IRE, Vol. 40(9), pages 1098–1101, copr. 1952, incorporated herein by reference. In Huffman encoding and decoding, symbols with high probabilities of occurrence get shorter bit length codes. Huffman encoding is widely used because it provides a straight forward, binary tree, construction and optimal average code word length.

Various techniques have been developed to decode Huffman codes. Basically, decoding a stream of Huffman codes is done by following a binary decoder tree. In general, these decompression engines either decode a Huffman code iteratively, one or two bits at a time using sequential logic, or in parallel, decoding the entire code in one clock cycle using combinatorial logic.

In the art of digital hard copy reproduction, a standard has been adopted which uses Huffman codes for data compression. This standard was proposed by the Joint Picture Expert Group (JPEG) of the ANSI X3L2.8 committee, published as: "JPEG Digital Compression and Coding of Continuous-tone Still Images," Draft ISO 10918, 1991. A similar standard was proposed by the Moving Picture Expert Group ("MPEG"), published as: ISO/IEC JTC1 CD 11172, "Coding of Moving Pictures and Associated Audio for Digital Storage Media Up to 1.5 Mbits/second," International Organization for Standardization, 1992 (known as "MPEG-1").

For high-bit rate applications, such as full color hard copy printers, color image transmission in faxes, or digital video transmission, and the like, design of a suitable Huffman decoder is critical. Both pipeline and parallel decoding is difficult because of the need for a feedback loop required to realign the bit stream. The variable length code must be decoded into its fixed length original data string using a programmable code look-up table. This operation must be completed, preferably in one cycle before the next code word can be decoded, a task complicated by the variable length nature of each consecutive code word. Moreover, in order to work at high clock frequencies, the amount of logic on the critical path must be minimized.

For the specific application of JPEG/MPEG data, there are further complexities in addition to the actual Huffman decoding operation. Huffman code words—limited to a maximum of 16-bits in the JPEG standard—are used to represent a "run-length limited (RLL)/coefficient" data pair. The RLL represents the number of consecutive zero coefficients immediately preceding the current coefficient, which has a size representative of the number of bits used to encode the actual coefficient data. Thus as shown in FIG. 1, each Huffman, variable length code word 103 is followed by a variable length encoded coefficient value 105, where the Huffman code word 103 tells how many bits are used to encode the coefficient value. For example, the data represented may be a signed, twelve bit coefficient value, for example a red, green, or blue ("RGB") or cyan, magenta, yellow, black ("CMYK") color stimuli vector for color transformation of an image pixel, 8-bits by 8-bits. Each code word is one coefficient which transformed from a pixel in the image. (The fundamentals of three-dimensional constructs for RGB or other trichromatic systems are discussed in the literature, such as *Principles of Color Technology*, Billmeyer and Saltzman, John Wiley & Sons publishers, NY, copr. 1981 (2d ed.) and *Color Science: Concepts and Methods, Quantitative Data and Formulae*, by Wyszecki and Stiles, John Wiley & Sons publishers, NY, 1982 (2d ed.), incorporated by reference. However, further explanation is not necessary to an understanding of the present invention to a person skilled in the art.)

Adding even further complexity, there generally are headers and control markers 107 embedded in the compressed JPEG/MPEG data stream. These markers are reserved data patterns; that is, reserved, particular strings of ones and zeros, that are embedded at byte boundaries in the data stream. Examples would be START OF SCAN, START OF IMAGE, END OF IMAGE, and RESTART markers. Thus, a JPEG Huffman decoder must detect marker presence and remove the marker as well as any padding bits that may have been added to align the marker to a byte boundary.

In a standard JPEG Huffman decoder using a lookup table of $2^{16}$ memory locations, the maximum 16-bits are used as an address to the lookup table which would provide the run and size for the particular code word received. However, this requires a large, slow memory. In other words, the location and length of the Huffman code must be determined, followed by a look-up table or other decode operation that will tell the run-length and size of the following coefficient, followed by extraction of that data and a subsequent shift to find the next code word to repeat the operation.

To reduce the address space, Tong et al. in U.S. Pat. No. 5,208,593 develops a method using a series of leading on's in the code word to index to a smaller memory. Adding bits negatively affects compression ratio. To increase speed, Retter et al. in U.S. Pat. No. 5,379,070 develop a parallel processing methodology. This method adds expensive hardware components.

Thus, there is a need for a high bit-rate Huffman decoding method and architecture suited to JPEG/MPEG data decompression of a bit data stream as shown in FIG. 1.

SUMMARY OF THE INVENTION

In its basic aspects, the present invention provides a method for decoding a Huffman encoded data stream having code word-coefficient pairs of a maximum length "Q." Basically, the method includes the steps of:

storing a first input data set, having a number of bits, comprising a coefficient and Huffman code word first pair in a data register having a data capacity of at least twice Q;

receiving a next sequential input data set comprising a coefficient-Huffman code word second pair of the stream in a shift register;

right shifting the next sequential input data set by the number of bits in the first data set;

performing a logical OR of the first input data set and the next sequential input data set into the data register; and extracting "N" most significant bits of the data register as a decoded coefficient value and extracting the "M" next significant bits of the data register as a Huffman code word.

In another basic aspect of the present there is provided a Huffman decoder apparatus for decoding a JPEG standard data stream having 16-bit maximum Huffman code words in a Huffman code word-coefficient pair data format, said data stream further including byte boundary information codes and header/marker information codes. The apparatus includes:

an input bus;

a right shift register connected to the input bus for receiving at least two code word-coefficient pairs therefrom;

bitwise logical OR mechanism for receiving right shift register data output therefrom;

an input data register connected to the logical OR mechanism for receiving output logical OR mechanism data therefrom;

a left shift register connected to the input data register for receiving output data therefrom;

a mechanism for extracting from the left shift register a current code word and a coefficient to be decoded from a code word-coefficient pair such that a run length of coefficients, a length of a variable length encoded coefficient, and a sum of length of a code word plus length of an encoded coefficient is obtained; and a feedback mechanism for left shifting the input data register in the amount of the sum to obtain a next current code word and a coefficient to be decoded.

It is an advantage of the present invention that the logic required in the decoding critical path is minimized.

It is another advantage of the present invention that one code word-coefficient pair is decoded on every clock cycle.

It is another advantage of the present invention that random access memory requirements for commercial implementation are acceptable.

It is yet another advantage of the present invention that control markers are properly detected and acted upon as necessary for compliance with JPEG and MPEG standards.

Other objects, features and advantages of the present invention will become apparent upon consideration of the following explanation and the accompanying drawings, in which like reference designations represent like features throughout the drawings.

BRIEF DESCRIPTION OF THE DRAWINGS

FIGS. 3A and 3B are a detail schematic logic diagram of the Huffman decoder in accordance with the present invention as shown in FIG. 2.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable. An exemplary embodiment in terms of the JPEG standard is provided. However, it will be recognized by a person skilled in the art that the invention can also be applied in MPEG or other data decoding. The use of the exemplary embodiment is not intended to be a limitation on the scope of the invention as set forth by the claims, nor should any such limitation be implied.

Figure 1:
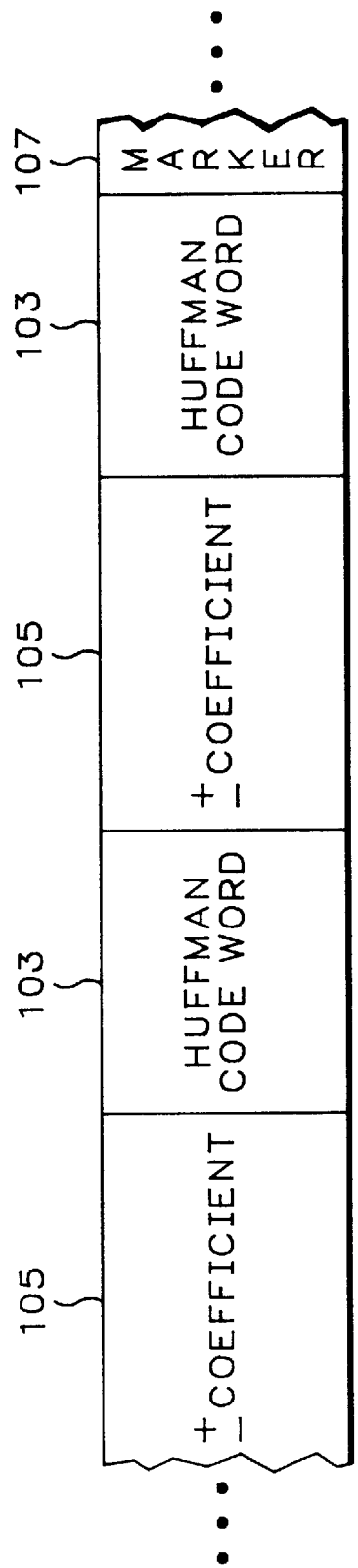
FIG. 1 is a schematic depiction of a compressed JPEG data stream.
Figure 2:
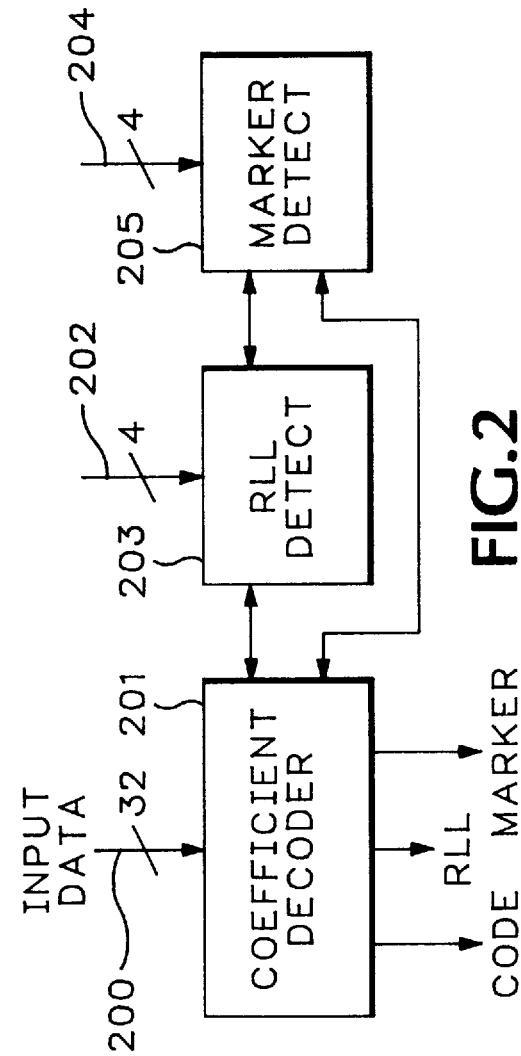
FIG. 2 is a schematic block diagram of a Huffman decoder in accordance with the present invention.

A specific exemplary embodiment of the present invention is shown in FIG. 2.

General Operation

By way of an overview, the compressed JPEG data stream is input in 32-bit string words—a single, maximum length, Huffman code word-coefficient pair—on bus 200 into a coefficient decoder 201. Byte boundary information, a 4-bit string word, is input via bus 202 to a RLL detector 203. Header/marker code 4-bit string words are input via bus 204 for decoding in marker detector 205. In general, only one input shift register is used for the input data string.

At the start of an image, two 32-bit input words are loaded. The amount to shift is cleared to zero at the start of an image, so no shift operation is performed on the first cycle. On each clock cycle thereafter, the data is shifted by the number of bits in a previous Huffman code word-coefficient pair.

A logical OR operation is then used for decoding. This is a relatively fast operation since it relieves the need for pointing in the data subset to where the next code word begins, thereby shortening the critical path. However, the problem becomes how to retain byte boundary information since the position of this information will be lost whenever a shift and OR operation with the existing input data is performed. The byte boundary information is obviously critical when a data stream header/marker, such as RESTART or END_OF_IMAGE JPEG marker, is encountered. This is therefore attended to in the parallel RLL detector 202 and marker detector 204 handling implementation.

Input Data—Loading

Figure 3A:
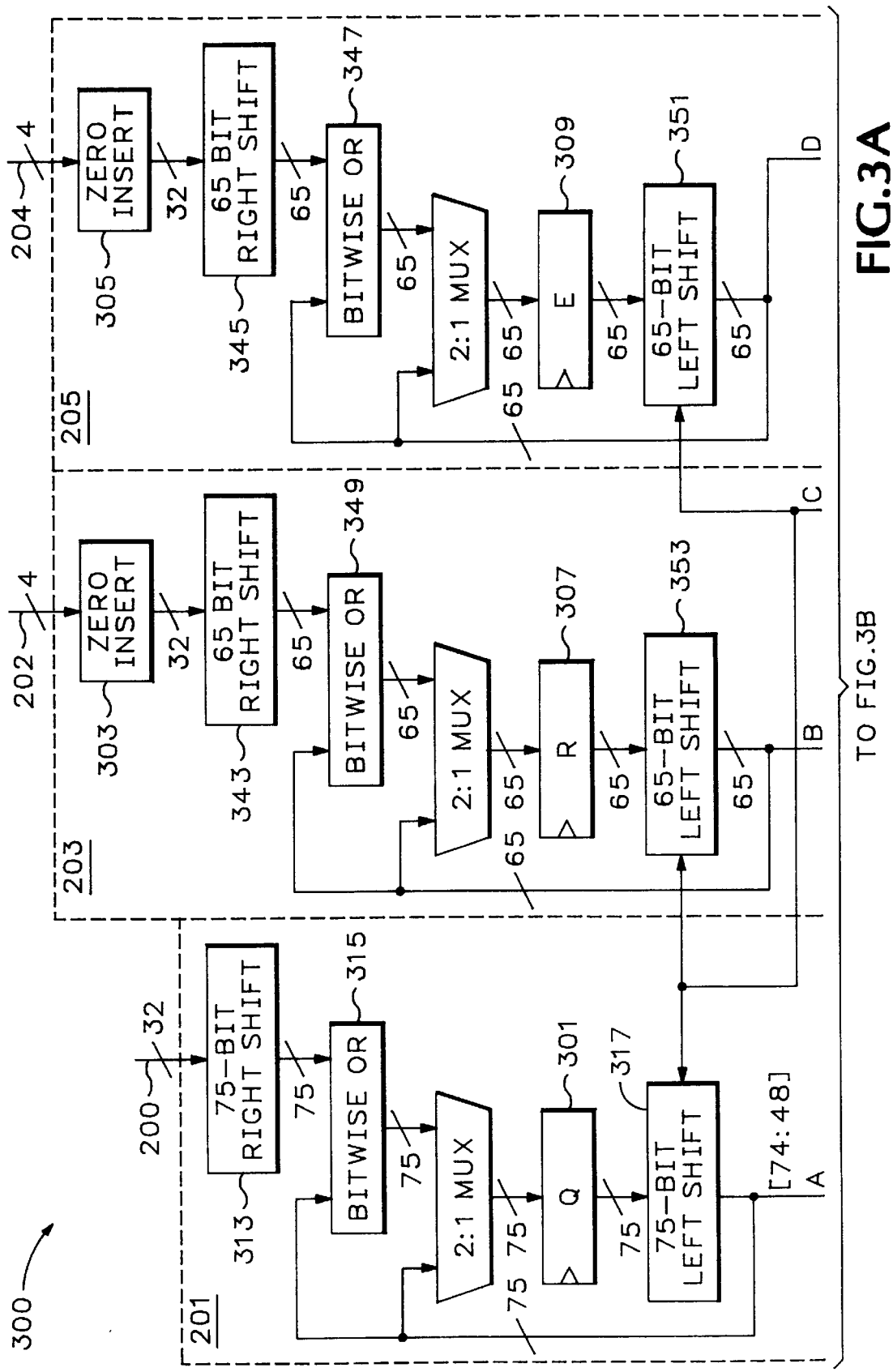

Looking to FIGS. 3A AND 3B, a specific embodiment of a high speed Huffman decoder 300 in accordance with the present invention is shown, including a solution to the dilemma of maintaining byte boundary and data stream marker information in proper registration. Standard logic is presented as will be recognized by those skilled in the art. The Huffman decoding technique itself employs a scheme for accessing a lookup table based on the number of leading ones in the Huffman code word. This method of decoding is described by in U.S. Pat. No. 4,899,149 (Kahan) and U.S. Pat. No. 5,208,593 (Tong) incorporated herein by reference in their entireties. Thus, the description hereinafter focuses on the description of the invention as claimed herein.

The 32-bit input data word received on bus 200 is loaded into a data register, "Q," 301, a 75-bit data register for the segment of the input data stream currently being decoded. Seventy-five bits are necessary because after shifting, the left most eleven bits hold the sign-stripped coefficient from the previous code word-coefficient pair. In addition to this set of eleven bits, two full 32-bit words from the current input data stream are queued. For decoding of a "next" Huffman code word, it is necessary to extract the code word from the data stream in the Q_register 301. In the JPEG standard, this code word can be up to 16-bits long. The preceding code word-coefficient pair may be up to 27-bits long (i.e., 16-bits for the code word and 11-bits for the encoded coefficient). Thus, on any given cycle, it is necessary to have a minimum of 43-bits (16-bits+27-bits) in the Q_register 301. Since forty-three is greater than a 32-bit input data word length, it has been determined to be an expeditious implementation to queue two 32-bit words.

Header/markers/byte Boundary Information Bits—
Loading

Header/markers and byte boundary information in the input data stream among the 32-bit words are detected in a standard manner as would be known in the art and separated out as 4-bit words onto buses 204, 202, respectively. Each of the RLL detector 205 and header/marker detector 203 then has each respective 4-bit input word expanded to 32-bits by an insertion of seven zeros between each of the 4-bits at "zero insert" hardware 303, 305, respectively.

In the exemplary embodiment, JPEG standard defined RESTART and END_OF_IMAGE ("EOI") markers are inserted into the compressed JPEG data stream on byte boundaries. These JPEG markers are detected by a marker detector 205 and 4-bits are output to indicate on which byte boundary in the 32-bit input word the marker was detected. The marker itself is removed from the input data stream. This 4-bit marker identification is expanded to a full 32-bits to match the input data word by the insertion of seven zeros in between each of the 4-bits. The bit position of the marker identifier bits thus lines up precisely with the point in the input data word where the marker was detected and removed.

A similarly expanded, 32-bit, RLL word is loaded into a register R, 307. The expanded, 32-bit, RESTART or EOI marker word is loaded into a register, "E," 309. Now, the Q_, R_, and E_registers 301, 307, 309 can be shifted synchronously such that byte boundary and header/marker locations are preserved in the same order as originally encoded in the input data. That is, as subsequent shift operations explained hereinafter take place, the input data stream Q_register 301, a RLL word in the R_register 307, and a RESTART or EOI marker word in the E_register 309 are shifted together and remain in synchronization with each other.

Input data—Decoding

A "next" subsequent 32-bit data word of the input data stream from bus 200 is right-shifted 313 by an amount equal to the number of data bits that will be present in the 75-bit data register 301 after the "current" left shift operation is processed. This is in preparation for a bitwise OR 315 operation into the Q_register 301. The right shift 313 operation plus the bitwise OR 315 operation has the net effect of loading the new 32-bit data word into proper position immediately to the right of all the data bits currently in the Q_register 301.

That "next" word is then bitwise OR'd 315 into the Q_register 301.

The 75-bit filled Q_register 301 is then left-shifted in a register 317 by the size of the sum of the first code word plus coefficient.

The left most 27-bits in the left-shifted data stream are then examined. Of these 27-bits, the left-most 11-bits in register 319 are the coefficient of the first code word-coefficient pair. Bits 63:48 contain the variable-length Huffman code which per the JPEG standard can be up to 16-bits long, assuming the left-most bit of the register is $bit_{74}$ and the right-most bit is $bit_0$.

Decoding the Huffman code using the lookup table produces the length of the combined Huffman code word and the sign-stripped coefficient. On the next clock cycle, the Q_register 301 is left shifted by this amount.

After the left shift, the left-most 11-bits of the Q_register 301 contain the variable length sign-stripped coefficient from the previous code word-coefficient part. The variable length, sign-stripped coefficient can be any length from zero to eleven bits, the COEFF_SIZE_A register 327 contains the length of this coefficient. The COFFICIENT_RESTORE unit 331 takes the sign-stripped coefficient and the coefficient length and produces the restored coefficient value as a 12-bit signed quantity output to the CODE_DECODE_HUFFMAN unit 333.

Note that if the coefficient is less than 11-bits in length, the information is contained in the right-most bits of the left-most 11-bits of the Q_register 301. Thus, via standard Boolean logic, encoded coefficient and coefficient size data are then used to restore the encoded coefficient to a 12-bit, signed quantity 331 which is output 333 to the next stage of the JPEG decoder (not shown).

The right-most 16-bits are the current Huffman code word, sent to an address generator 321 to compute the address to access in the Huffman look-up table 323. The look-up table 323 then provides the zero run-length 325 (the number of zeros inserted in the coefficient which must be reinserted in the decoded data) and coefficient size data 327, as well as the overall length of the current code word-coefficient pair, equal to the next left shift amount, 329. That is, the number of positions to shift the left-shift register 317 for the next examination cycle.

The lookup table decodes the Huffman code word from the input data stream and provides three values:

(1) the run length of zero coefficients, (2) the length of the variable length encoded coefficient, and (3) the sum of the length of the Huffman code word and the length of the encoded coefficient.

The last value is used immediately to left shift the Q_register 301. The length of the variable length encoded coefficient is used to restore the coefficient to its 12-bit signed value. The run length information is output directly to the run length decoder 363 delayed by the RUN_LENGTH_A register 325 and RUN_LENGTH_B register 326 as in the pipelined implementation the run length and coefficient size information must be delayed to match up with the correct coefficient from the CODE_DECODE_HUFFMAN register 333.

As the input data is of variable length, a valid_bits register 311 is used to keep track of how many valid bits are present in each of the Q_register 301 data, R_register 307 byte boundary information, and E_register 309 header/marker. As bits are shifted out of the registers 301, 307, 309, the value of the shift—provided by the look-up table each cycle—must be subtracted from the valid_bit count.

When a new 32-bit word of input data is loaded, thirty-two is then added, at 312, to the valid_bits count. The load control 314 monitors the number of valid data bits in the Q_register 301 and the amount of left-shift that will be applied on the next clock cycle. When the load control 314 calculates that the number of valid data bits in the Q_register 301 will fall below forty-three, it issues a signal to load a new data word into the Q_register (i.e., if number of valid data bits minus amount of shift is less than forty-three, load a new data word)

Header/markers/byte Boundary Information Bits—Decoding

Now it can be recalled from the previous description, that expanded 32-bit header/markers and byte boundary words were created in the E_register 309 and R_register 307, respectively. These 32-bit quantities are right-shifted in shift registers 345, 343, respectively, and bitwise OR'd 347, 349, respectively, in the exact same manner and clock cycle as their appurtenant input data word in the Q_register 301. Then, as the data is being left-shifted 317, the header/control markers and byte boundary words are left-shifted through respective registers 351, 353 at the same time, maintaining relative position therewith. By examining the left-most bits of these registers 351, 353, zeros inserted in the E_register 309 and R_register 307 can be detected 355 and left-shifted 357 out of the data stream and the header/markers 365 and boundary words 363 output accordingly.

In summary, the present invention thus encodes the run, the size of the coefficient, and the addition of the coefficient and the code word length. That value comes out as the shift amount which tells the amount of shift to get to the next code word. This presents a faster methodology for decoding JPEG Huffman coded bit streams as decoding is occurring as new data is being received. Simultaneously, byte boundaries and header/markers are tracked properly by circuitry 203, 205 mimicking the data handling in the Huffman decoder 201. Once an EOI marker is detected, the decoder continues processing until the received data is exhausted.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method for decoding an encoded data stream having code word-coefficient pairs of a maximum length "Q," the method comprising the steps of:

storing a first input data set, having a number of bits, comprising a coefficient and code word first pair in a data register having a data capacity of at least twice Q;

receiving a next sequential input data set comprising a code word-coefficient second pair of the stream in a shift register;

right shifting the next sequential input data set by the number of bits in the first input data set;

performing a logical OR of the first input data set and the next sequential input data set into the data register;

extracting "N" most significant bits of the data register as a decoded coefficient value and extracting the "M" next significant bits of the data register as a code word.

2. The method as set forth in claim 1, further comprising the step of:

repeating the steps of claim 1 for each next sequential input data set of the data stream until the stream is ended.

3. The method as set forth in claim 1, further comprising the steps of:

receiving byte boundary information embedded in the data stream with an appurtenant data set;

padding each bit of the byte boundary information with a string of zeros between the bits such that byte boundary information has a bit length equal to input data set length;

right shifting the byte boundary information simultaneously with the appurtenant data set;

extracting each of the string of zeros to reformulate the byte boundary information in position with the decoded data set.

4. The method as set forth in claim 3, further comprising the steps of:

receiving control marker information embedded in the data stream with an appurtenant data set;

padding each bit of the control marker information with a string of zeros between the bits such that control marker information has a bit length equal to input data set length;

right shifting the control marker information simultaneously with the appurtenant data set;

extracting each of the string of zeros to reformulate the control marker information in position with the decoded data set.

5. The method as set forth in claim 1, further comprising the steps of:

on each clock cycle, the data is shifted by total number of bits in the previous code word-coefficient pair.

6. An input data stream decoder for variable length encoded bit string code word-coefficient pairs, the data stream also including byte boundary codes and header/marker codes, comprising:

decoding means for receiving and for decoding the code word-coefficient pairs sequentially, including input shifting means for receiving at least two input data sets, means for performing a logical OR operation of a current input data set with a next subsequent input data set, means for storing and shifting a resultant bit string of the logical OR operation of a current input data set with a next subsequent input data set, means for separating a code word-coefficient pair into a code word and a coefficient, means for examining the code word and extracting a decoded address therefrom, and means for shifting the means for storing and shifting by a sum equal to length of a current code word plus length of an encoded coefficient.

7. The decoder as set forth in claim 6, further comprising:

means for receiving and for tracking the byte boundary information codes, including means for padding the byte boundary information codes to the same bit length as the code-word-coefficient input data set, and means for shifting the byte boundary information codes synchronously with code word-coefficient pair data.

8. The decoder as set forth in claim 6 further comprising:

means for receiving and for tracking the header/marker information codes, including means for padding the header/marker information codes to the same bit length as the code-word-coefficient pair, and means for shifting the header/marker information codes synchronously with the code word-coefficient pairs.

9. A Huffman decoder apparatus for decoding a JPEG standard data stream having 16-bit maximum Huffman code words in a Huffman code word-coefficient pair data format, the data stream further including byte boundary information codes and header/marker information codes, the apparatus comprising:

an input bus;

a right shift register connected to the input bus for receiving at least two code word-coefficient pairs therefrom;

bitwise logical OR means for receiving right shift register data output therefrom;

an input data register connected to the logical OR means for receiving output logical OR means data therefrom;

a left shift register connected to the input data register for receiving output data therefrom;

means for extracting from the left shift register a current code word and a coefficient to be decoded from a code word-coefficient pair such that a run length of coefficients, a length of a variable length encoded coefficient, and a sum of length of a code word plus length of an encoded coefficient is obtained;

feedback means for left shifting the input data register in the amount of the sum to obtain a next current code word and a coefficient to be decoded.

10. The apparatus as set forth in claim 9, further comprising:

means for receiving and for tracking the byte boundary information codes, including
means for padding the byte boundary information codes to the same bit length as the code-word-coefficient pair, and
means for shifting the byte boundary information codes synchronously with the code word-coefficient pairs.

11. The apparatus as set forth in claim 9, further comprising:

means for receiving and for tracking the header/marker information codes, including
means for padding the header/marker information codes to the same bit length as the code word-coefficient pair, and
means for shifting the header/marker information codes synchronously with the code word-coefficient pairs.

12. The apparatus as set forth in claim 9, wherein the input register comprises:

a register having a data capacity of at least twice the bit width of the input bus.

13. A method for decoding JPEG/MPEG compressed data bit streams having words of a maximum bit length "Q", comprising the steps of:

receiving sequential input data words to be decoded in an input register having a bit capacity greater than twice the maximum bit length "Q";

appending each sequential input data word to a preceding input data word in the input register;

right shifting each new data word by the number of valid data bits in the register, wherein valid bits are the number of bits in a preceding input data word;

performing a logical OR operation of two sequential input data words;

storing a result of the logical OR operation in an operative data register;

left shifting the operative data register based upon the number of bits in a preceding code word-coefficient pair and extracting "N" most significant bits of the operative data register as a decoded coefficient value and "M" next significant bits of the data register as a Huffman code word.

14. The method as set forth in claim 13, further comprising the step of:

repeating the steps of claim 13 for each next sequential input code word-coefficient pairs of the data stream until the stream is ended.

15. The method as set forth in claim 13, further comprising the steps of:

receiving byte boundary information embedded in the data stream with an appurtenant data set;

padding each bit of the byte boundary information with a string of zeros between the bits such that byte boundary information has a bit length equal to input data set length;

right shifting the byte boundary information simultaneously with the appurtenant data set;

extracting each of the string of zeros to reformulate the byte boundary information in position with the decoded data set.

16. The method as set forth in claim 13, further comprising the steps of:

receiving control marker information embedded in the data stream with an appurtenant data set;

padding each bit of the control marker information with a string of zeros between the bits such that control marker information has a bit length equal input data set length;

right shifting the control marker information simultaneously with the appurtenant data set;

extracting each of the string of zeros to reformulate the control marker information in position with the decoded data set.

17. The method as set forth in claim 13, further comprising the steps of:

on each clock cycle, the data is shifted by total number of bits in an immediately previous code word-coefficient pair.

* * * * *

UNITED STATES PATENT AND TRADEMARK OFFICE
CERTIFICATE OF CORRECTION

PATENT NO.   : 5,818,364
DATED        : October 6, 1998
INVENTOR(S)  : Jeffrey A. Hintzman, Jr. et al.

It is certified that error appears in the above-identified patent and that said Letters Patent is hereby corrected as shown below:

Column 2,
Line 47, delete "on's" and insert therefor -- one's --

Column 4,
Line 53, after "described" delete "by"

Signed and Sealed this

Eleventh Day of June, 2002

Attest:

Attesting Officer

JAMES E. ROGAN
Director of the United States Patent and Trademark Office